United States Patent
Kim et al.

(10) Patent No.: US 11,728,534 B2
(45) Date of Patent: Aug. 15, 2023

(54) ELECTRODE ASSEMBLY AND RECHARGEABLE BATTERY INCLUDING THE SAME

(71) Applicant: LG CHEM, LTD., Seoul (KR)

(72) Inventors: Hyoung Kwon Kim, Daejeon (KR); Duk Hyun Ryu, Daejeon (KR); Jeeeun Kim, Daejeon (KR); Hayoung Heo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 103 days.

(21) Appl. No.: 16/978,554

(22) PCT Filed: Sep. 11, 2019

(86) PCT No.: PCT/KR2019/011875
§ 371 (c)(1),
(2) Date: Sep. 4, 2020

(87) PCT Pub. No.: WO2020/111468
PCT Pub. Date: Jun. 4, 2020

(65) Prior Publication Data
US 2021/0021004 A1    Jan. 21, 2021

(30) Foreign Application Priority Data

Nov. 30, 2018   (KR) ................. 10-2018-0152916

(51) Int. Cl.
*H01M 10/6551*    (2014.01)
*H01M 10/613*     (2014.01)
(Continued)

(52) U.S. Cl.
CPC ... *H01M 10/6551* (2015.04); *H01M 10/0431* (2013.01); *H01M 10/613* (2015.04);
(Continued)

(58) Field of Classification Search
CPC .......... H01M 10/6551; H01M 10/613; H01M 10/653; H01M 10/6553; H01M 10/0431; H01M 50/538
See application file for complete search history.

(56) References Cited

U.S. PATENT DOCUMENTS

| 8,273,209 B2 | 9/2012 | Hattori et al. |
| 8,318,347 B2 | 11/2012 | Yokoyama et al. |

(Continued)

FOREIGN PATENT DOCUMENTS

| CN | 106847767 A | 6/2017 |
| CN | 107994202 A | 5/2018 |

(Continued)

OTHER PUBLICATIONS

International Search Report issued in PCT/KR2019/011875 (PCT/ISA/210), dated Jan. 3, 2020.

(Continued)

*Primary Examiner* — Karie O'Neill Apicella
(74) *Attorney, Agent, or Firm* — Birch, Stewart, Kolasch & Birch, LLP

(57) ABSTRACT

A jelly-roll type of electrode assembly in which a negative electrode sheet, a positive electrode sheet, and a separation membrane interposed between the negative electrode sheet and the positive electrode sheet are wound together is provided. The electrode assembly also includes: at least one electrode tab attached to the negative electrode sheet or the positive electrode sheet and at least a portion extending outside; and a heat radiation tape adhered to the electrode. The electrode tab to which the heat radiation tape is adhered is positioned between the center part of the wound electrode assembly and an external circumferential surface, or on the external circumferential surface, the heat radiation tape (Continued)

includes a heat diffusion layer, and the heat diffusion layer includes at least one of graphite and a metal foil.

13 Claims, 8 Drawing Sheets

(51) Int. Cl.
*H01M 10/653* (2014.01)
*H01M 10/6553* (2014.01)
*H01M 50/538* (2021.01)
*H01M 10/04* (2006.01)

(52) U.S. Cl.
CPC ..... *H01M 10/653* (2015.04); *H01M 10/6553* (2015.04); *H01M 50/538* (2021.01)

(56) References Cited

U.S. PATENT DOCUMENTS

| | | | |
|---|---|---|---|
| 2005/0196667 | A1 | 9/2005 | Brand |
| 2007/0154787 | A1 | 7/2007 | Jang |
| 2008/0254348 | A1 | 10/2008 | Hatta |
| 2010/0104935 | A1 | 4/2010 | Hermann et al. |
| 2011/0039134 | A1 | 2/2011 | Kim et al. |
| 2011/0171521 | A1* | 7/2011 | Sohn ............... H01M 50/10 429/175 |
| 2011/0274951 | A1 | 11/2011 | Yasui et al. |
| 2012/0156564 | A1* | 6/2012 | Kim ................ H01M 50/595 429/211 |
| 2014/0134461 | A1 | 5/2014 | Inoue et al. |
| 2016/0006070 | A1* | 1/2016 | Sohn ............... H01M 50/183 429/127 |
| 2017/0115074 | A1 | 4/2017 | Cheng |
| 2017/0194606 | A1* | 7/2017 | Lim ................. H01M 10/058 |
| 2017/0309871 | A1* | 10/2017 | Jo ................... H01M 10/0585 |
| 2018/0083311 | A1* | 3/2018 | Kim ................. C09J 7/10 |
| 2021/0167437 | A1 | 6/2021 | Choi et al. |

FOREIGN PATENT DOCUMENTS

| | | | | |
|---|---|---|---|---|
| JP | 2000-277088 | A | 10/2000 | |
| JP | 2006-93147 | A | 4/2006 | |
| JP | 2007-184238 | A | 7/2007 | |
| JP | 2010-149509 | A | 7/2010 | |
| JP | 2011-40387 | A | 2/2011 | |
| JP | 2011-249015 | A | 12/2011 | |
| JP | 4900534 | B2 | 3/2012 | |
| JP | 2016-219368 | A | 12/2016 | |
| JP | 2017-82331 | A | 5/2017 | |
| JP | 2017-123212 | A | 7/2017 | |
| JP | 2017123212 | A * | 7/2017 | ......... H01M 10/617 |
| JP | 2017-168225 | A | 9/2017 | |
| JP | 2017168225 | A * | 9/2017 | ......... H01M 10/613 |
| JP | 2018-137141 | A | 8/2018 | |
| JP | 2018-530896 | A | 10/2018 | |
| KR | 10-2008-0092871 | A | 10/2008 | |
| KR | 10-2013-0085202 | A | 7/2013 | |
| KR | 10-2015-0037335 | A | 4/2015 | |
| KR | 10-2017-0023466 | A | 3/2017 | |
| KR | 10-2018-0027872 | A | 3/2018 | |
| KR | 10-1838738 | B1 | 3/2018 | |
| KR | 10-2018-0081235 | A | 7/2018 | |
| WO | WO 2017/073028 | A1 | 5/2017 | |
| WO | WO-2017073028 | A1 * | 5/2017 | ......... H01M 10/613 |

OTHER PUBLICATIONS

Extended European Search Report for European Application No. 19891446.7, dated Apr. 6, 2021.

* cited by examiner

ELECTRODE ASSEMBLY AND RECHARGEABLE BATTERY INCLUDING THE SAME

CROSS-REFERENCE TO RELATED APPLICATION

This application claims priority to and the benefit of Korean Patent Application No. 10-2018-0152916 filed in the Korean Intellectual Property Office on Nov. 30, 2018, the entire contents of which are incorporated herein by reference.

TECHNICAL FIELD

The present invention relates to an electrode assembly and a rechargeable battery including the same. More particularly, the present invention relates to an electrode assembly including an electrode tab, and a rechargeable battery including the same.

BACKGROUND ART

Recently, a demand for portable electronic products such as laptop computers, video cameras, portable telephones, and the like has been rapidly increasing, and development of electric vehicles, energy storage batteries, robots, satellites, and the like is active, thus much research has been made on secondary batteries used as a driving power source therefor.

Such a secondary battery includes, for example, a nickel cadmium battery, a nickel hydrogen battery, a nickel zinc battery, and a lithium secondary battery. Among them, the lithium secondary battery, compared with a nickel-based secondary battery, since memory effects hardly occur, is widely used in high-technology electronic devices due to its advantages such as free charging and discharging, a very low self-discharge rate, a high operating voltage, a high energy density per unit weight, and the like.

Generally, a lithium secondary battery has a structure in which unit cells configured of a positive electrode, a negative electrode, and a separation membrane interposed therebetween are stacked or wound, it is embedded in a case of a metal can or laminate sheet, and an electrolyte solution is injected or impregnated therein.

An electrode assembly of a positive electrode/separation membrane/negative electrode structure configuring the secondary battery is mainly divided into a jelly roll type (wound type) and a stack type (stacked type) according to its structure. The jelly roll type is a structure obtained by interposing a separation membrane between long sheet-type positive and negative electrodes coated with an active material and then winding it, and a stack type is a structure in which a plurality of positive and negative electrodes with a predetermined size are sequentially stacked in a state in which a separation membrane is interposed therebetween. Among them, the jelly roll type of electrode assembly is easy to manufacture and has a merit of high energy density per weight.

In the rechargeable battery equipped with such an electrode assembly, if a large current flows within a short time due to a high rate discharge, an overcharge, an external short circuit, etc., the separation membrane contracts due to the heating of the electrode tab, particularly a cathode tab, and the electrode active material and the separation membrane become semi-fused, so a problem that they are pushed and attached occurs. In addition, an internal short circuit may occur due to damage to the separation membrane, which may result in heat generation or explosion of the battery.

In particular, recently, in order to implement a high power and high-capacity model, used components are becoming thin membranes, and as a result, rechargeable batteries with low resistance and high capacity are increasing. However, as the resistance is lowered and the capacity is increased, a larger current is applied for a longer time, and therefore a problem of heat generation of the electrode tab due to an external short circuit has become a more important problem.

In order to overcome this problem, research on a rechargeable battery capable of effectively controlling heat generation of an electrode tab is required.

DISCLOSURE

Technical Problem

An object of the exemplary embodiments of the present invention is to solve the above problems, to provide an electrode assembly for a rechargeable battery that may effectively control the heat generation of the electrode tab in a situation of an external short circuit, a high rate discharge, etc.

Technical Solution

An electrode assembly according to an exemplary embodiment of the present invention as a jelly-roll type of electrode assembly in which a negative electrode sheet, a positive electrode sheet, and a separation membrane interposed between the negative electrode sheet and the positive electrode sheet are wound together and the electrode assembly further includes: at least one electrode tab attached to the negative electrode sheet or the positive electrode sheet with at least a portion thereof extending outside of the negative electrode sheet or the positive electrode sheet; and a heat radiation tape adhered to the at least one electrode tab, wherein the at least one electrode tab to which the heat radiation tape is adhered is positioned between a center part of the wound electrode assembly and an external circumferential surface of the wound electrode assembly, or on the external circumferential surface of the wound electrode assembly, wherein the heat radiation tape includes a heat diffusion layer, and wherein the heat diffusion layer includes at least one selected from the group consisting of graphite and a metal foil.

The graphite may include at least one selected from the group consisting of natural graphite and artificial graphite.

The metal foil may include at least one selected from the group consisting of Cu and Al.

An adhesion area of the heat radiation tape may be larger than an attachment area of the at least one electrode tab.

A region corresponding to the adhesion area of the heat radiation tape may include a region corresponding to the attachment area of the at least one electrode tab.

The heat radiation tape may further include an adhesive layer, and the adhesive layer may be disposed between the at least one electrode tab and the heat diffusion layer, and between the negative electrode sheet or the positive electrode sheet and the heat diffusion layer.

The heat radiation tape may further include an adhesive layer, the adhesive layer may be disposed between the negative electrode sheet or positive electrode sheet and the heat diffusion layer, and at least a portion of the at least one electrode tab may be in direct contact with the heat diffusion layer.

A thickness of the heat diffusion layer may be from 17 μm to 1 mm.

The heat radiation tape may further include an adhesive layer and a base layer, and the heat diffusion layer may be disposed between the adhesive layer and the base layer.

The base layer may include at least one selected from the group consisting of polyimide and polyethylene terephthalate.

A thickness of the adhesive layer may be from 5 μm to 25 μm, and a thickness of the base layer may be from 5 μm to 25 μm.

The at least one electrode tab may include a negative electrode tab connected to the negative electrode sheet and a positive electrode tab connected to the positive electrode sheet, the positive electrode tab may be positioned between the center part of the wound electrode assembly and the external circumferential surface of the wound electrode assembly, and the negative electrode tab may be positioned on the external circumferential surface of the wound electrode assembly.

A rechargeable battery according to an exemplary embodiment of the present invention may include an electrode assembly described above.

Advantageous Effects

According to exemplary embodiments of the present invention, heat generated in the electrode tab due to an external short circuit is rapidly diffused and discharged to the surroundings through the heat radiation tape attached to the electrode tab, thereby preventing the damage to the separation membrane or the internal short circuit.

MODE FOR INVENTION

Figure 1:
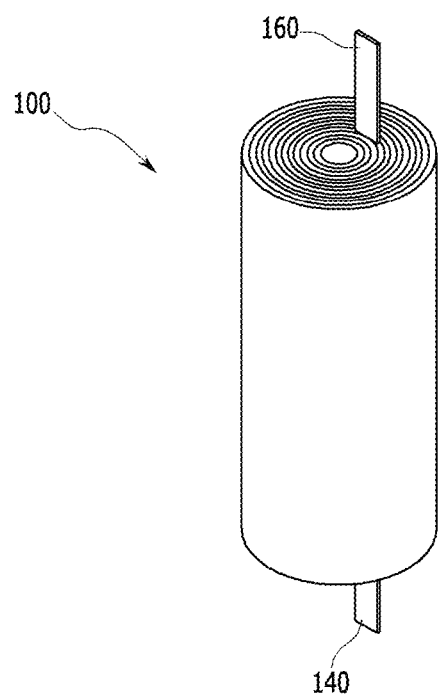
FIG. 1 is a perspective view of an electrode assembly according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, a portion that is not directly related to the present invention was omitted, and the same reference numerals are attached to the same or similar constituent elements through the entire specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, but does not essentially mean positioning on the upper side of the object portion based on a gravity direction.

In addition, unless explicitly described to the contrary, the word "comprise" and variations such as "comprises" or "comprising", will be understood to imply the inclusion of stated elements but not the exclusion of any other elements.

Throughout the specification, the phrase "on a plane" means viewing the object portion from the top, and the phrase "on a cross-section" means viewing a cross-section of which the object portion is vertically cut from the side.

Figure 2:
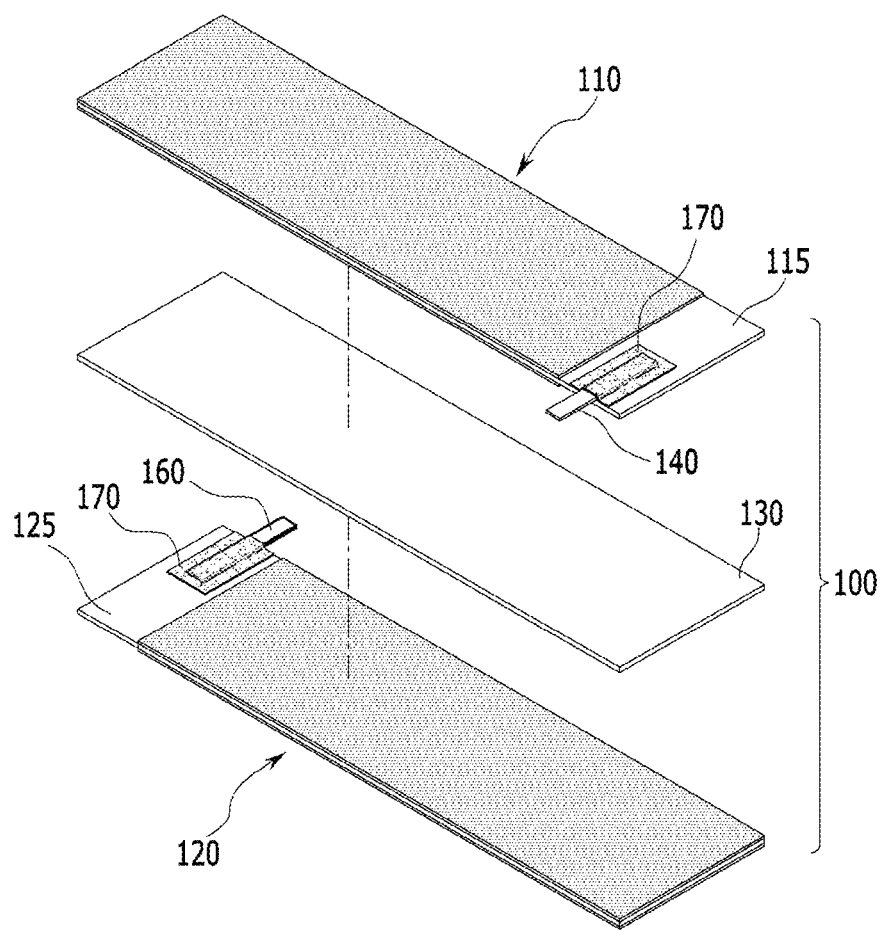
FIG. 2 is an exploded perspective view of an electrode assembly of FIG. 1 before winding.

FIG. 1 is a perspective view of an electrode assembly according to an exemplary embodiment of the present invention, and FIG. 2 is an exploded perspective view of an electrode assembly of FIG. 1 before winding.

Referring to FIG. 1 and FIG. 2, an electrode assembly 100 according to an exemplary embodiment of the present invention, in which a negative electrode sheet 110, a positive electrode sheet 120, and a separation membrane 130 interposed between the negative electrode sheet 110 and the positive electrode sheet 120 are wound, includes at least one of electrode tabs 140 and 160 attached to the negative electrode sheet 110 or the positive electrode sheet 120 and having at least a part extending outside and a heat radiation tape 170 adhered to the at least one of the electrode tabs 140 and 160, the at least one of the electrode tabs 140 and 160 adhered with the heat radiation tape 170 is disposed between the center portion of the wound electrode assembly 100 and the external circumferential surface, and the heat radiation tape 170 includes a heat diffusion layer. The heat diffusion layer includes at least one of graphite and a metal foil. The heat diffusion layer is described later. Although not shown, the electrode tab may be disposed on the external circumferential surface of the wound electrode assembly.

The electrode assembly 100 may be sealed and received together with an electrolyte solution in a case (not shown) to be manufactured as the rechargeable battery.

The electrode tabs 140 and 160 include a negative electrode tab 140 attached to the negative electrode sheet 110 and a positive electrode tab 160 attached to the positive electrode sheet 120. A negative active material is formed on the surface In the negative electrode sheet 110, and the negative electrode tab 140 may be attached to a negative uncoated region 115 in which the negative active material is not formed among the surface of the negative electrode sheet 110. A positive active material is formed on the surface in the positive electrode sheet 120, and the positive electrode tab 160 may be attached to a positive uncoated region 125 in which the positive active material is not formed among the surface of the positive electrode sheet 120.

Since the configuration of the positive electrode sheet 120 and the configuration of the negative electrode sheet 110 are the same as or similar to each other, it is described based on the negative electrode sheet 110 among the electrodes with reference to FIG. 3 to FIG. 7.

Figure 3:
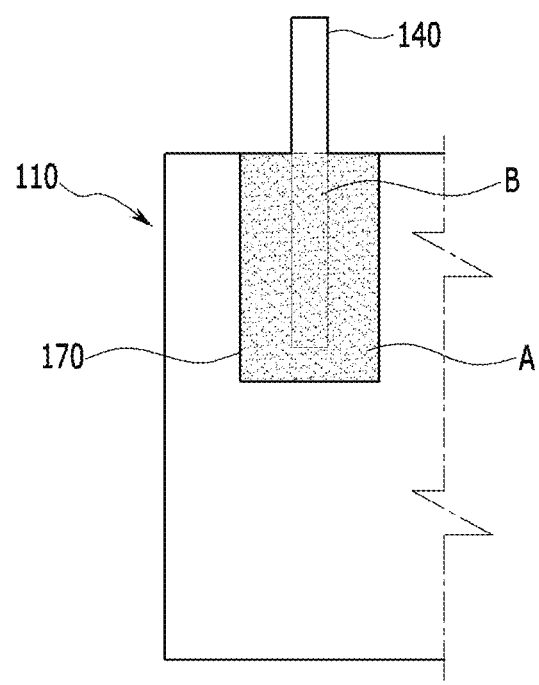
FIG. 3 and FIG. 4 are top plan views of a negative electrode tab among electrode tabs according to an exemplary embodiment of the present invention.

FIG. 3 is an enlarged top plan view of a negative electrode tab among electrode tabs according to an exemplary embodiment of the present invention. The negative electrode tab 140 among the electrode tabs is attached to the negative electrode sheet 110, and at least a portion extends outside. The attachment between the negative electrode tab 140 and the negative electrode sheet 110 is not limited as long as the electrical connection is possible, but ultrasonic welding or resistance welding may be performed.

The heat radiation tape 170 is attached to the negative electrode tab 140, and the heat radiation tape includes a heat diffusion layer.

In the rechargeable battery of the high power and high-capacity model, when a large current flow within a short time due to a high rate discharge, an overcharge, an external short circuit, etc., a large amount of heat is generated in the electrode tab and particularly at the negative electrode tab 140 due to the current concentration. Since the rechargeable battery is constantly repeatedly charged or discharged by an internal electrochemical reaction, when the rechargeable battery becomes high-capacity, the heat generated by the charge and discharge increases dramatically. The separation membrane 130 may be contracted and the electrode active material and the separation membrane 130 of the negative electrode sheet 110 and the positive electrode sheet 120 is in a semi-fused state by the heat generation of the negative electrode tab 140 such that damage that they are stuck to each other may be caused. In addition, an internal short circuit may occur due to damage of the separation membrane 130, resulting in heat generation of the rechargeable battery.

The heat radiation tape 170, to effectively eliminate the heat generated in the electrode tab due to the current concentration, includes a heat diffusion layer having an excellent heat conduction characteristic and is attached to the electrode tab, thereby quickly diffusing and discharging the locally generated heat in the electrode tab to the surroundings. Damage to the separation membrane 130 and the internal short circuit may thereby be prevented.

Most heat is generated in the negative electrode tab 140, which is a part having particularly high resistance among the internal constituent elements of the rechargeable battery. Therefore, the heating problem of the electrode tab needs to be more importantly controlled in the negative electrode tab 140, but it is not necessarily limited to the negative electrode tab 140, and in the case of the positive electrode tab 160, the heating phenomenon may still be a problem. Accordingly, the heat radiation tape may be adhered to at least one of the negative electrode tab 140 attached to the negative electrode sheet 110 and the positive electrode tab 160 attached to the positive electrode sheet 120.

Again referring to FIG. 3, an adhesion area A of the heat radiation tape 170 is larger than an attachment area B of the negative electrode tab 140. In detail, since the adhesion area A where the heat radiation tape 170 is adhered is larger than the attachment area B where the negative electrode tab 140 is attached to the negative electrode sheet 110, the heat radiation tape 170 is adhered to the negative electrode sheet 110, particularly the negative uncoated region 115, as well as the negative electrode tab 140. The adhesion area A of the heat radiation tape 170 may be differentiated according to the size of the battery, but it is preferable that the height of the adhesion area A is 0.5 times or more of the height of the negative electrode sheet parallel thereto, and it is preferable that the width of the adhesion area A is 5 mm to 50 mm. If the width of the adhesion area A is less than 5 mm, the locally generated heat from the negative electrode tab 140 may not be diffused and discharged effectively. On the other hand, if the width of the adhesion area A exceeds 50 mm, since the exterior diameter of the wound electrode assembly 100 increases due to the heat radiation tape 170, which is more than necessary in the limited space of the rechargeable battery, the amount of the active material is limited such that this may cause a decrease in battery capacity and may interfere with the winding of the electrode assembly 100.

On the other hand, it is preferable that the width of the adhesion area of the heat radiation tape 170 in the positive electrode tab 160 is 5 mm to 30 mm. If it is less than 5 mm, the locally generated heat from the positive electrode tab 160 may not be effectively diffused and released. On the other hand, the heat radiation tape 170 in the positive electrode tab 160 preferably covers all of the positive uncoated region 125 for the stable attachment of the positive electrode tab 160, but because it may lead to reduced capacity of the rechargeable battery, the width of the adhesion area is preferably 30 mm or less by considering the area of the positive uncoated region 125.

In addition, the region corresponding to the adhesion area A of the heat radiation tape 170 may include the region corresponding to the attachment area B of the negative electrode tab 140. That is, at least a portion of the negative electrode tab 140 extends to the outside, and the other portion is attached to the negative electrode sheet 110 and together covered by the heat radiation tape 170. Since the area corresponding to the adhesion area to which the negative electrode tab 140 is attached is included in the area corresponding to the adhesion area of the heat radiation tape 170, the temperature of the heat generating portion may not only be lowered by effectively diffusing heat generated from the negative electrode tab 140, but it is also possible to prevent damage such as a tear or penetration of the separation membrane by the edge of the negative electrode tab 140.

The characteristics of the adhesion area of the heat radiation tape may be applied to be the same or similar even when the heat radiation tape is bonded to the positive electrode tab.

Figure 4:
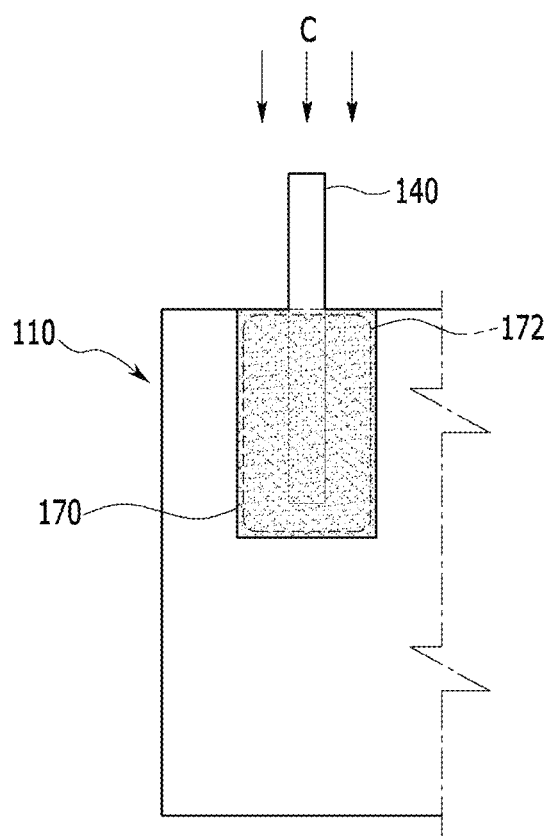
Figure 5:
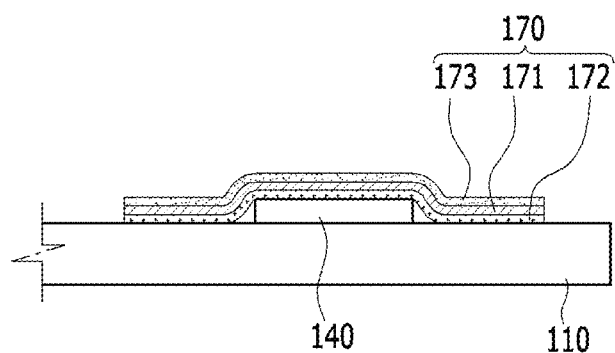
FIG. 5 is a front view in a direction C of FIG. 4.

FIG. 4 is an enlarged top plan view of a negative electrode tab among electrode tabs according to an exemplary embodiment of the present invention, and FIG. 5 is a front view in a direction C of FIG. 4. Referring to FIG. 4 and FIG. 5, the heat radiation tape 170 may further include an adhesive layer 172, and the adhesive layer 172 may be disposed between the negative electrode tab 140 and a heat diffusion layer 171 and between the negative electrode sheet 110 and the heat diffusion layer 171. The heat diffusion layer 171 may be fixedly disposed on the negative electrode tab 140 and the negative electrode sheet 110 through the adhesive layer 172.

Figure 6:
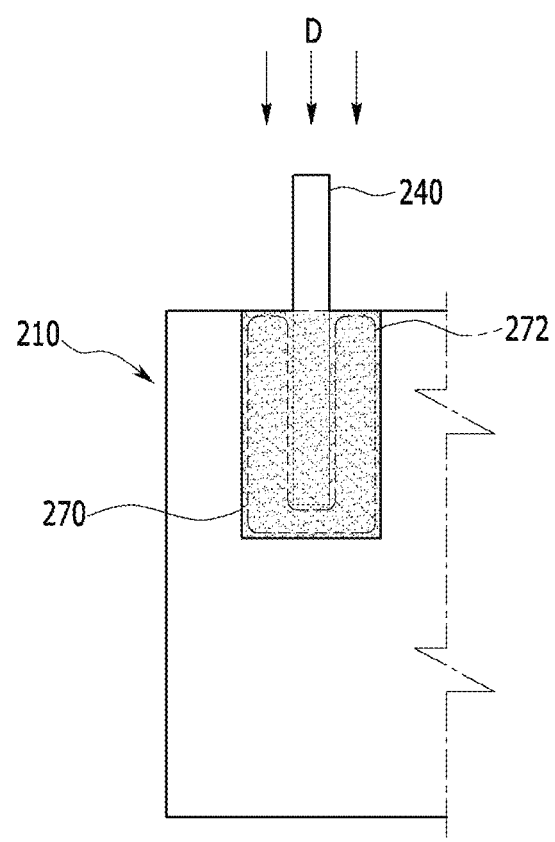
FIG. 6 is an enlarged top plan view of a negative electrode tab among electrode tabs according to an exemplary embodiment of the present invention.
Figure 7:
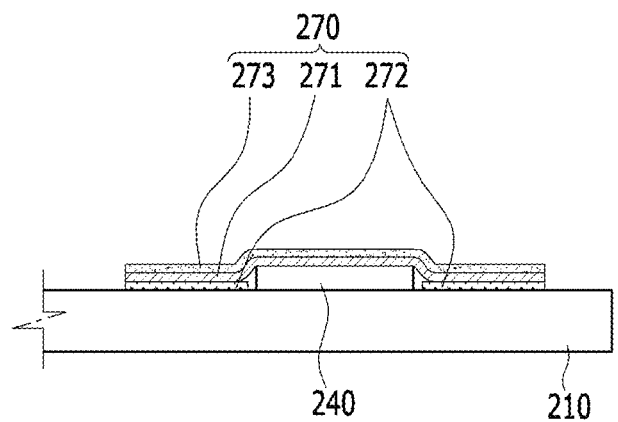
FIG. 7 is a front view in viewing in a direction D of FIG. 6.

FIG. 6 is an enlarged top plan view of a negative electrode tab among electrode tabs according to another exemplary embodiment of the present invention, and FIG. 7 is a front view in a direction D of FIG. 6. Referring to FIG. 6 and FIG. 7, a heat radiation tape 270 may further include an adhesive layer 272, and the adhesive layer 272 may be disposed between a negative electrode sheet 210 and a heat diffusion layer 271, and at least a portion of a negative electrode tab 240 may be in contact with the heat diffusion layer 271. That is, the heat diffusion layer 271 may not only be fixedly disposed on the negative electrode tab 240 and the negative electrode sheet 210 through the adhesive layer 272 disposed between the negative electrode sheet 210 and the heat diffusion layer 271, but also the heat diffusion layer 271 may be in direct contact directly above at least a portion of the negative electrode tab 240, so that heat generated locally on the negative electrode tab 240 due to high rate discharge may be more rapidly diffused.

The characteristics of the heat radiation tape including the adhesive layer may be applied to be the same or similar even when the heat radiation tape is bonded to the positive electrode tab.

Again referring to FIG. 5, and FIG. 7, the heat radiation tapes 170 and 270 according to the exemplary embodiments of the present invention may further include the adhesive layers 172 and 272 and base layers 173 and 273, respectively, as well as the heat diffusion layers 171 and 271, and the heat diffusion layers 171 and 271 may be disposed between the adhesive layers 172 and 272 and the base layers 173 and 273.

The heat diffusion layers 171 and 271, as mentioned above, are to diffuse and release heat generated in the positive electrode tab or the negative electrode tab, and are not particularly limited as long as the thermal conductivity is excellent, however it is preferable to include at least one of the metal foil and the graphite, and the graphite may include at least one of natural graphite and artificial graphite. Since the heat diffusion layers 171 and 271 are sheet-shaped, heat transfer is performed in a horizontal direction parallel to the heat diffusion layers 171 and 271 by a heat diffusion principle.

The thickness of the heat diffusion layers 171 and 271 is preferably 17 μm to 1 mm. Specific thicknesses for each material are described below.

The natural graphite is a material with good producibility because it is easily formed in various thicknesses and widths, and it is preferable to form the natural graphite with a thickness of 0.07 mm to 1 mm. If the thickness is less than 0.07 mm, the heat diffusion layer may be too thin such that the heat transfer may be limited, and if the thickness is greater than 1 mm, the heat diffusion effect may be reduced due to the excessive thickness, and the capacity of the rechargeable battery may be reduced as a side effect.

The artificial graphite is artificially produced graphite, and because it is excellent in its heat dissipation characteristic to be produced as a thin membrane, it is preferable to form the thickness of 17 μm to 40 μm. If the thickness is less than 17 μm, the heat diffusion layer may be too thin such that the heat transfer may be limited, and if the thickness is greater than 40 μm, the heat diffusion effect may be reduced due to the excessive thickness, and the capacity of the rechargeable battery may be reduced as a side effect.

The metal foil is a material that may form the heat diffusion layer relatively inexpensively and may include at least one of Cu and Al having high thermal conductivity, and the metal foil is preferably formed in a thickness of 25 μm to 90 μm.

The adhesive layers 172 and 272 are for fixing and positioning the heat radiation tapes 170 and 270 including the heat diffusion layers 171 and 271 on the electrode tabs, and may include an acryl-based adhesive.

The thicknesses of the adhesive layers 172 and 272 may be from 5 μm to 25 μm. The adhesion of the heat radiation tapes 170 and 270 may be maintained when the thickness is at least 5 μm, but when the thickness is more than 25 μm, there may be a problem in that heat is not effectively diffused due to the unnecessary thickness.

The base layers 173 and 273 are foundation layers of the heat radiation tapes 170 and 270, and are not particularly limited as long as they can perform insulation and heat-resistance functions, but preferably include at least one of polyimide and polyethylene terephthalate.

The thicknesses of the base layers 173 and 273 may be 5 μm to 25 μm. The thickness of 5 μm is a minimum thickness at which the base layers 173 and 273 may exhibit insulation performance, and if the thickness is more than 25 μm, there may be a problem in that heat is not effectively diffused due to the unnecessary thickness.

Again referring to FIG. 1 and FIG. 2, the electrode assembly 100 according to an exemplary embodiment of the present invention is an electrode assembly 100 in the form of the jelly roll in which the separation membrane 130 is interposed and wound between the negative electrode sheet 110 and the positive electrode sheet 120. Since the electrode assembly 100 is the in the form of the jelly roll, each bend of the negative electrode sheet 110, the positive electrode sheet 120, and the separation membrane 130 directly or indirectly in contact with the electrode tab may be damaged due to heat generated from the electrode tab. However, the electrode assembly 100 according to the exemplary embodiment of the present invention may minimize the above-described damage due to the heat diffusion effect of the heat radiation tape 170 adhered to the electrode tab. That is, when the heat radiation tape of the present invention is applied to the electrode assembly 100 of the form of the jelly roll, it is possible to minimize the damage due to heat.

The electrode assembly described above is included in the rechargeable battery and may be applied to various devices. The device may be applied to a vehicle such as an electric bicycle, an electric vehicle, or a hybrid vehicle, but is not limited thereto and may be applied to various devices that may use the rechargeable battery.

Experimental Example 1

Figure 8:
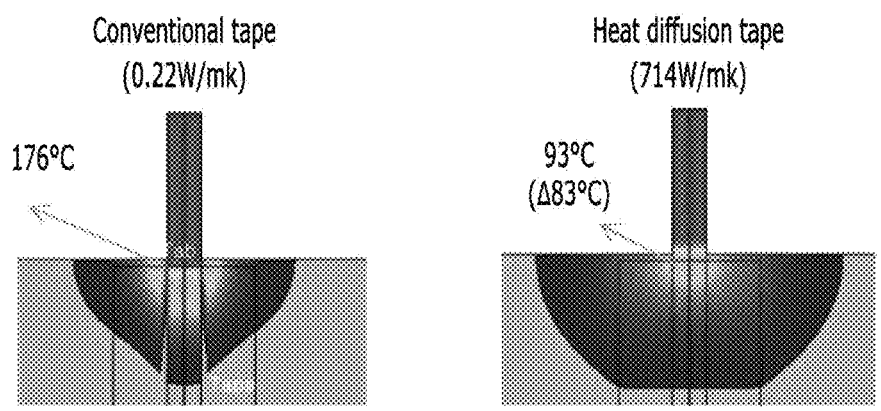
FIG. 8 shows an experimental result of comparing a temperature gradient between an electrode tab to which a heat radiation tape including a heat diffusion layer according to an exemplary embodiment of the present invention is adhered and an electrode tab to which a tape not containing a heat diffusion layer is used.

Experimental results of comparing a temperature gradient between the electrode tab to which the heat radiation tape including the heat diffusion layer of the artificial graphite is adhered and the electrode tab to which the tape without the heat diffusion layer is adhered are shown in FIG. 8. The thickness of the heat radiation tape including the heat diffusion layer of the artificial graphite is 40 μm, and the thickness of the heat diffusion layer of artificial graphite is 25 μm.

The heat radiation tape including the heat diffusion layer has horizontal thermal conductivity of 74 W/mK, and the tape without the heat diffusion layer has a horizontal thermal conductivity of 0.22 W/mK. Therefore, it may be confirmed that the heat diffusion is easier in the electrode tab to which the heat radiation tape including the heat diffusion layer is adhered than the electrode tab to which the tape without the heat diffusion layer is adhered such that the temperature of the electrode tab is further lowered. The horizontal thermal conductivity means thermal conductivity in a direction parallel to the heat radiation tape.

Experimental Example 2

The horizontal thermal conductivity is measured for each case including the artificial graphite, the natural graphite, and the metal foil for the heat radiation tape including the heat diffusion layer according to the exemplary embodiments of the present invention and for the heat radiation tape without the heat diffusion layer, and is shown in Table 1.

TABLE 1

| Division | Horizontal thermal conductivity (W/mK) |
|---|---|
| Artificial graphite | 800 |
| Natural graphite | 250 |
| Metal foil | 100-250 |
| Without the heat diffusion layer | <1.0 |

Referring to Table 1, the heat radiation tape including the heat diffusion layer according to the exemplary embodiments of the present invention shows high horizontal thermal conductivity, as compared with the case without the heat diffusion layer. Therefore, it is possible to disperse heat generated inside the rechargeable battery more effectively, and particularly, as the heat radiation tape containing the artificial graphite or the natural graphite shows 3 to 8 times higher horizontal thermal conductivity for the case including the metal foil, to include the graphite, particularly the artificial graphite, is particularly desirable.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: electrode assembly
140: negative electrode tab
160: positive electrode tab
170, 270: heat radiation tape
171, 271: heat diffusion layer

The invention claimed is:

1. A jelly-roll type of electrode assembly in which a negative electrode sheet, a positive electrode sheet, and a separation membrane interposed between the negative electrode sheet and the positive electrode sheet are wound together, the electrode assembly further comprising:
at least one electrode tab attached to the negative electrode sheet or the positive electrode sheet and at least a portion thereof extending outside of the negative electrode sheet or the positive electrode sheet; and
a heat radiation tape adhered to the at least one electrode tab,
wherein the at least one electrode tab to which the heat radiation tape is adhered is positioned between a center part of the wound electrode assembly and an external circumferential surface of the wound electrode assembly, or on the external circumferential surface of the wound electrode assembly,
wherein each of the negative electrode sheet and the positive electrode sheet has a portion coated with an active material and an uncoated portion not having an active material and the at least one electrode tab is attached to the uncoated portion of the negative electrode sheet or the uncoated portion of the positive electrode sheet,
wherein the heat radiation tape contacts the uncoated portion of the negative electrode sheet or the uncoated portion of the positive electrode sheet to which the at least one electrode tab is attached,
wherein the heat radiation tape includes a heat diffusion layer, and
wherein the heat diffusion layer comprises at least one selected from the group consisting of graphite and a metal foil.

2. The electrode assembly of claim 1, wherein the graphite comprises at least one selected from the group consisting of natural graphite and artificial graphite.

3. The electrode assembly of claim 1, wherein the metal foil comprises at least one selected from the group consisting of Cu and Al.

4. The electrode assembly of claim 1, wherein an adhesion area of the heat radiation tape is larger than an attachment area of the at least one electrode tab.

5. The electrode assembly of claim 4, wherein a region corresponding to the adhesion area of the heat radiation tape includes a region corresponding to the attachment area of the at least one electrode tab.

6. The electrode assembly of claim 5, wherein the heat radiation tape further includes an adhesive layer, and
the adhesive layer is disposed between the at least one electrode tab and the heat diffusion layer and between the negative electrode sheet or the positive electrode sheet and the heat diffusion layer.

7. The electrode assembly of claim 5, wherein the heat radiation tape further includes an adhesive layer, the adhesive layer is disposed between the negative electrode sheet or positive electrode sheet and the heat diffusion layer, and
at least a portion of the at least one electrode tab is in direct contact with the heat diffusion layer.

8. The electrode assembly of claim 1, wherein a thickness of the heat diffusion layer is from 17 μm to 1 mm.

9. The electrode assembly of claim 1, wherein the heat radiation tape further includes an adhesive layer and a base layer, and
the heat diffusion layer is disposed between the adhesive layer and the base layer.

10. The electrode assembly of claim 9, wherein the base layer comprises at least one selected from the group consisting of polyimide and polyethylene terephthalate.

11. The electrode assembly of claim 9, wherein a thickness of the adhesive layer is from 5 μm to 25 μm, and
a thickness of the base layer is from 5 μm to 25 μm.

12. A rechargeable battery comprising an electrode assembly according to claim 1.

13. The electrode assembly of claim 1, wherein the at least one electrode tab includes:
a negative electrode tab connected to the negative electrode sheet; and
a positive electrode tab connected to the positive electrode sheet,
the positive electrode tab is positioned between the center part of the wound electrode assembly and the external circumferential surface of the wound electrode assembly, and
the negative electrode tab is positioned on the external circumferential surface of the wound electrode assembly.

* * * * *